United States Patent
Murata (10) Patent No.: US 8,343,649 B2
(45) Date of Patent: Jan. 1, 2013

(54) ELECTRICITY STORAGE DEVICE WITH ENHANCED HEAT DISSIPATION

(75) Inventor: Takashi Murata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 479 days.

(21) Appl. No.: 12/593,828

(22) PCT Filed: Mar. 26, 2008

(86) PCT No.: PCT/IB2008/000705
§ 371 (c)(1),
(2), (4) Date: Sep. 29, 2009

(87) PCT Pub. No.: WO2008/120064
PCT Pub. Date: Oct. 9, 2008

(65) Prior Publication Data
US 2010/0112429 A1 May 6, 2010

(30) Foreign Application Priority Data

Mar. 30, 2007 (JP) .................. 2007-090152

(51) Int. Cl.
*H01M 10/50* (2006.01)
*H01M 6/42* (2006.01)
*H01M 2/02* (2006.01)

(52) U.S. Cl. ........ 429/120; 429/175; 429/164; 429/185; 429/153

(58) Field of Classification Search .................. 429/120, 429/592, 62, 86, 89, 91, 163, 185, 175, 164, 429/153
See application file for complete search history.

(56) References Cited

U.S. PATENT DOCUMENTS

| | | | | |
|---|---|---|---|---|
| 2,740,824 A | * | 4/1956 | Stanimirovitch | 429/120 |
| 3,745,048 A | * | 7/1973 | Dinkler et al. | 429/120 |
| 5,316,872 A | * | 5/1994 | Baer | 429/62 |
| 5,559,420 A | | 9/1996 | Kohchi | |
| 6,569,561 B1 | * | 5/2003 | Kimura et al. | 429/159 |
| 2005/0202310 A1 | | 9/2005 | Yahnker | |
| 2006/0141342 A1 | * | 6/2006 | Marconi et al. | 429/86 |
| 2006/0216579 A1 | * | 9/2006 | Cho | 429/62 |

FOREIGN PATENT DOCUMENTS

| | | |
|---|---|---|
| CN | 1848519 A | 10/2006 |
| DE | 30 44741 C1 | 6/1982 |
| JP | 2000-133225 A | 5/2000 |
| JP | 2001-060466 A | 3/2001 |
| JP | 2006-127921 A | 5/2006 |
| JP | 2006-278332 A | 10/2006 |
| WO | WO 2007/001345 A | 1/2007 |

OTHER PUBLICATIONS

Machine Translation of: JP 2000/133225, Maeda et al., May 2000.*
Machine Translation of: JP 2006/127921, Murata et al., May 2006.*
Office Action issued in CN 200880010452.0 on Jun. 13, 2011 & English translation thereof.
Office Action issued in CN 200880010452.0 on Apr. 12, 2012 & English translation thereof.

* cited by examiner

*Primary Examiner* — Jonathan Crepeau
*Assistant Examiner* — Kenneth Douyette
(74) *Attorney, Agent, or Firm* — Kenyon & Kenyon LLP (57) ABSTRACT

An electricity storage device has: an enclosed container; an electricity storage unit contained in the enclosed container; a coolant, contained in the enclosed container, for cooling the electricity storage unit; and protrusions that extend into the coolant and conduct the heat of the coolant to a top lid of the enclosed container. The protrusions are formed on the top lid.

18 Claims, 7 Drawing Sheets

ELECTRICITY STORAGE DEVICE WITH ENHANCED HEAT DISSIPATION

This is a 371 national phase application of PCT/IB2008/000705 filed 26 Mar. 2008, claiming priority to Japanese Patent Application No. 2007-090152 filed 30 Mar. 2007, the contents of which are incorporated herein by reference.

BACKGROUND OF THE INVENTION

1. Field of the Invention

The invention relates to an electricity storage device in which an enclosed container contains an electricity storage unit and a coolant for cooling the electricity storage unit.

2. Description of the Related Art

Electrically-powered vehicles, such as electric vehicles and hybrid vehicles, have been actively developed. The demand for secondary batteries, for use as driving or auxiliary power sources for such electrically powered vehicles, that are excellent in performance, reliability and safety is developing.

In the field of electrically powered vehicles, driving or auxiliary power sources are required to have a high power density. As an example of such power sources, there is an electricity storage device that has an enclosed container that contains a battery pack, in which a plurality of cells are connected in series or in parallel, and a coolant for cooling the battery pack. The enclosed container includes a container body, the upper side of which is open, and a top lid that covers the upper opening of the container body.

In the above electricity storage device, when the battery pack produces heat during charging and discharging, the coolant is heated, and the heat of the coolant is dissipated from the enclosed container into the outside of the electricity storage device. In this way, the temperature rise in the battery pack is controlled.

Japanese Patent Application Publication No. 2006-127921 (JP-A-2006-127921) discloses a power supply device including a plurality of battery modules, a case that contains these battery modules, a cooling mechanism for cooling the battery modules contained in the case with the use of circulated coolant, and a radiator that cools the coolant.

However, if an air space exists between the top lid and the coolant, the rate of heat transfer from the coolant to the container will be reduced, and there is a possibility that the cooling of the battery pack will be insufficient. Therefore, when the coolant is injected into the container, the amount of coolant must be accurately measured in order for the coolant to be in contact with the top lid of the container.

Furthermore, the heated coolant will move upward in the enclosed container, and there is a possibility that the dissipation of heat will be impeded if there is an air space between the top lid and the coolant.

A method can be conceived in which a little less coolant is injected into the container, the top lid is fixed to the container, and then the coolant is added through the coolant inlet formed in the top lid. With this method, however, it is troublesome to inject the coolant after the lid has been fixed, and to close the coolant inlet. Moreover, there is a possibility that the strength of the top lid becomes insufficient when the coolant inlet is formed in the top lid.

On the other hand, a method can be conceived in which the coolant is injected to the upper limit level of the container, and the top lid is then fixed to the container. With this method, however, there is a possibility that, when the lid is fixed, the coolant will leak out of the container, which can cause air to be mixed into the coolant, which can in turn result in insufficient dissipation of heat.

SUMMARY OF THE INVENTION

The invention provides an electricity storage device having excellent capability to dissipate heat from coolant, which is manufactured using a simple process.

A first aspect of the invention relates to an electricity storage device including: an enclosed container provided with a top lid; an electricity storage unit contained in the enclosed container; a coolant, contained in the enclosed container, for cooling the electricity storage unit; and a protrusion, protruding from the top lid into the coolant, for transferring heat in the coolant to the top lid of the enclosed container.

In the above electricity storage device, the protrusion may be formed only on the top lid. A plurality of the protrusions may be provided.

The inner surface of the top lid may be parallel to a surface of the coolant.

The protrusion may also serve as a guide for guiding the coolant that moves upward because of the heat received from the electricity storage unit.

The electricity storage unit may be an electricity storage element assembly that is obtained by electrically connecting a plurality of electricity storage elements in series or in parallel. Each of the electricity storage elements may have a cylindrical shape. Each of the protrusions may extend in a horizontal direction perpendicular to a longitudinal direction of the electricity storage elements, and also serve as a guide for guiding the coolant in which natural convection occurs.

The electricity storage unit may have a pair of holding members, and the plurality of electricity storage elements may be arranged between the pair of holding members such that the axes of the electricity storage elements are mutually parallel. The protrusions may be formed so as to extend in a horizontal direction perpendicular to an axial direction of the electricity storage elements, to guide, toward a side surface of the enclosed container in a substantially horizontal direction, the coolant that moves upward because of the heat received from the electricity storage unit.

The top region of the pair of holding members may be fixed to the top lid.

The top lid may include an inner plate portion, and the protrusion may be formed on the top lid with the use of the inner plate portion.

The top lid may be made of a material with high thermal conductivity; and the top lid, the inner plate portion, and the protrusion may be integrally formed.

A second aspect of the invention relates a method of manufacturing an electricity storage device in which an enclosed container including a container body and a top lid contains an electricity storage unit and a coolant for cooling the electricity storage unit. A protrusion is formed on an inner surface of the top lid, and the coolant is injected into the container body such that a surface of the coolant is positioned between the level of the bottom end portion of the protrusion and the level of the upper end portion of the protrusion.

According to the invention, it is possible to transfer the heat in the coolant to the top lid through the protrusion, and release the heat from the top lid. In addition, because the coolant has only to be in contact with the protrusion, it is made easy to adjust the amount of coolant.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Embodiments of the invention will be described below.

Figure 1:
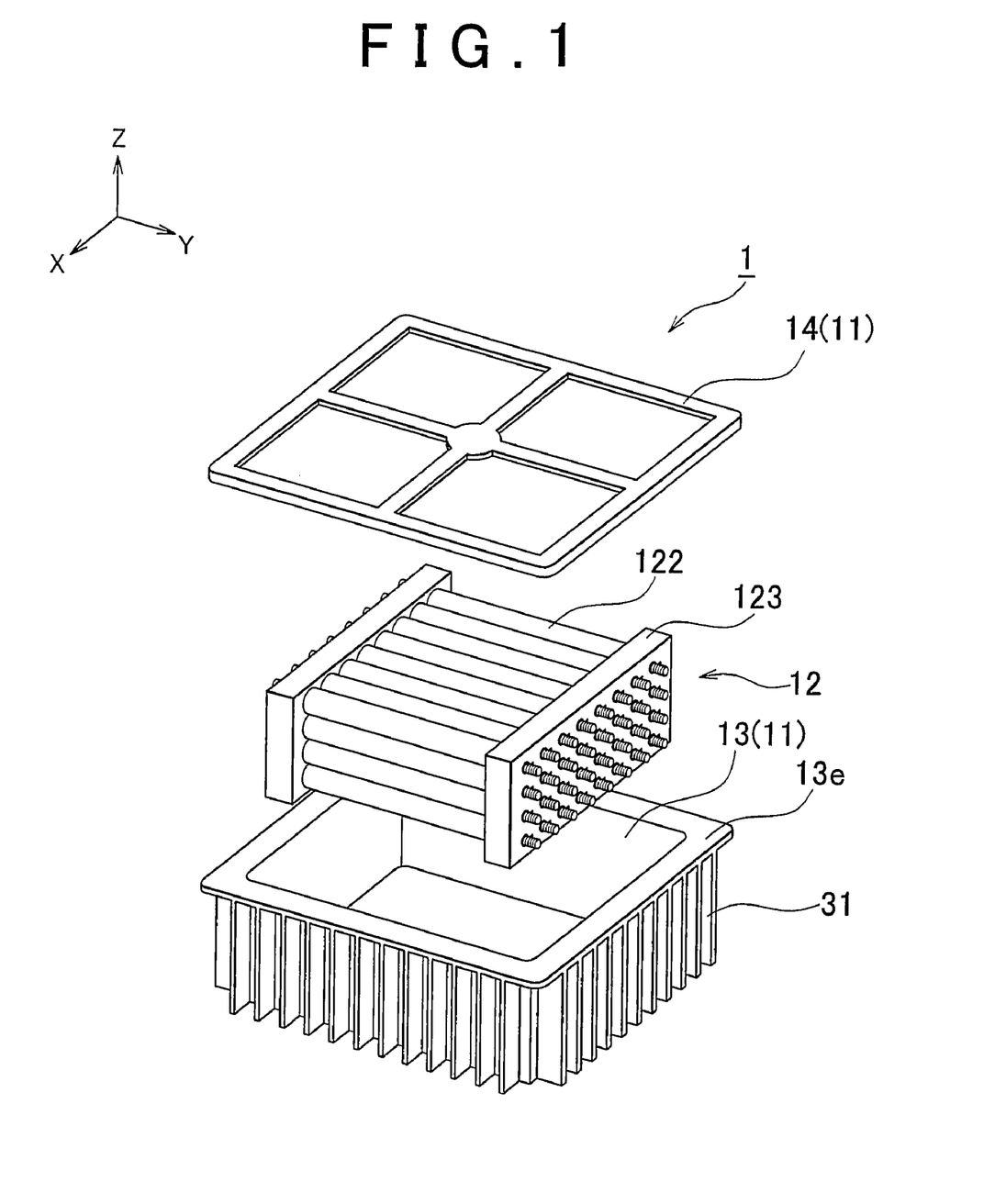
FIG. 1 is an exploded perspective view of the battery device.
Figure 2:
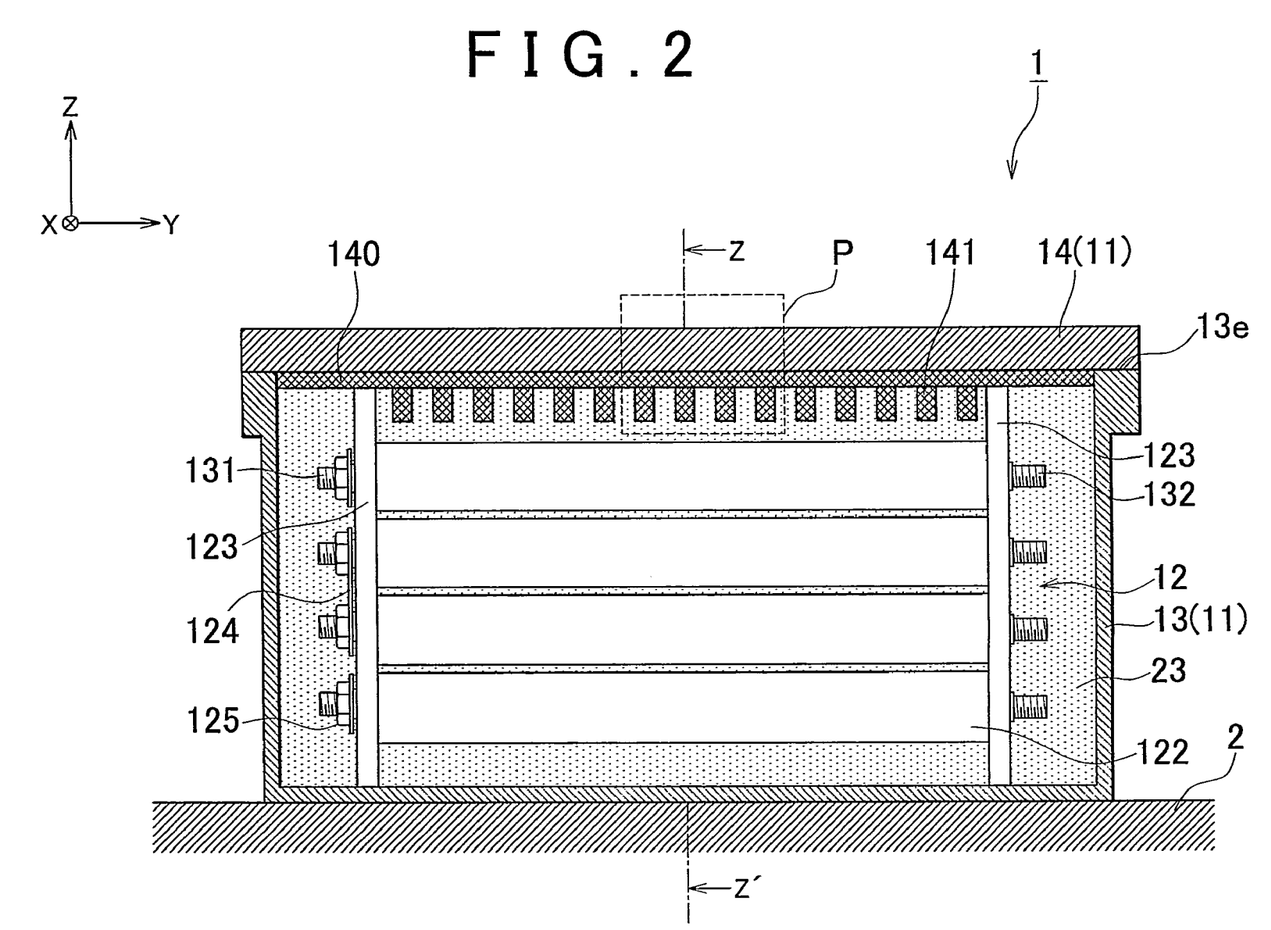
FIG. 2 is a sectional view of the battery device.
Figure 3:
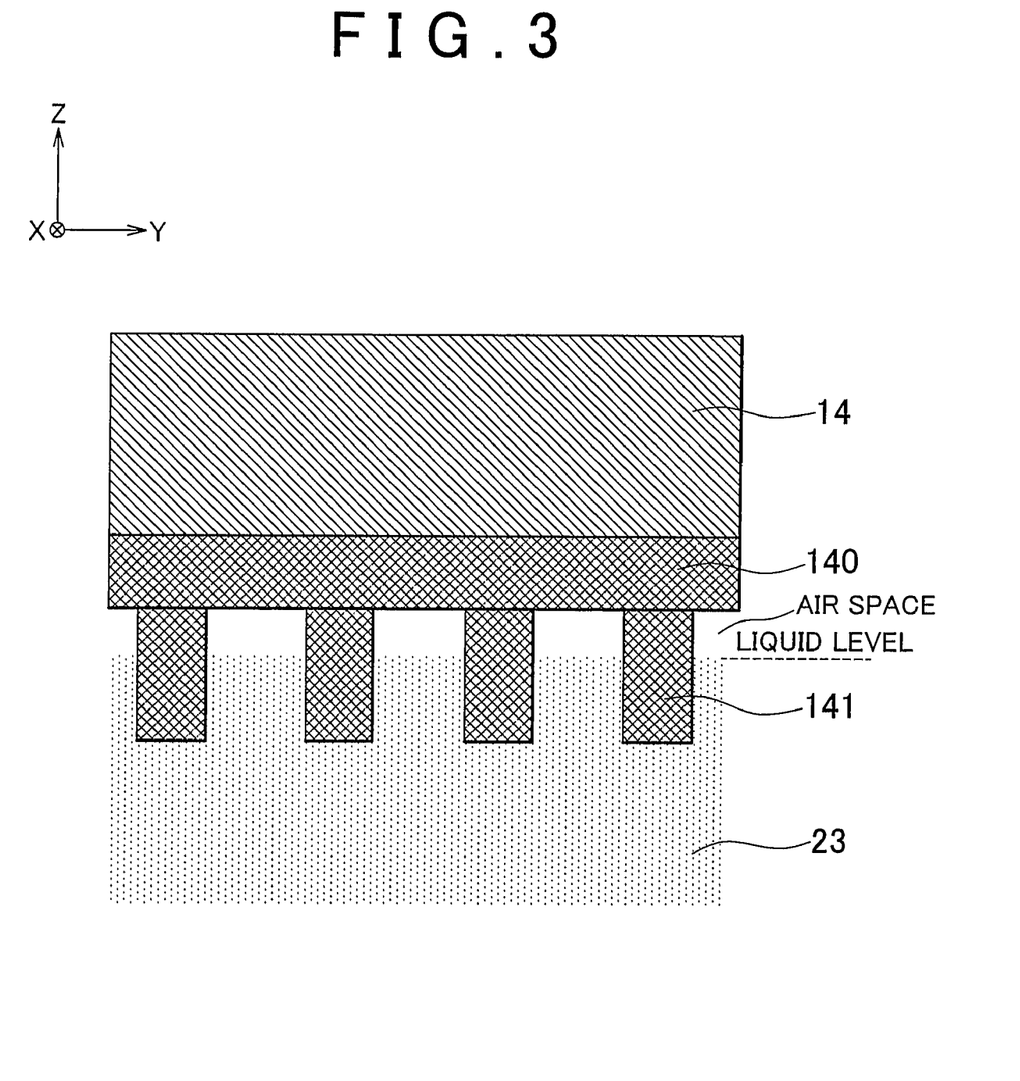
FIG. 3 is a partially enlarged view of FIG. 2.

A configuration of a battery device (electricity storage device), which is an embodiment of the invention, will be described with reference to FIGS. 1 to 3. FIG. 1 is an exploded perspective view of the battery device. FIG. 2 is a sectional view of the battery device. FIG. 3 is a partially enlarged view of the battery device, in which a region enclosed by the dotted line P of FIG. 2 is enlarged. The battery device of the present embodiment can be used as a driving or auxiliary power source for an electric vehicle or a hybrid vehicle.

A container body 13 that has an opening open upward contains a battery pack (electricity storage unit) 12 and a coolant 23 for cooling the battery pack 12. A top lid 14 is fixed onto a lid fixation surface 13e of the container body 13 so as to cover the opening. The top lid 14 and the container body 13 constitute an enclosed container 11.

The battery pack 12 is formed by arranging a plurality of cylindrical batteries (electricity storage elements) 122 in parallel between a pair of battery holders (holding members) 123. Each of the cylindrical batteries 122 generates heat when charged or discharged, and, if the temperature increase caused by heat generation due to charge and discharge is excessively large, deterioration of the battery is accelerated. For this reason, it is required to quickly release the heat in the coolant 23 into the outside of the battery device.

In consideration of the above circumstances, in the present embodiment, as shown in FIG. 2, a plurality of protrusions 141 that protrude into the coolant 23 are provided on the inner surface of the top lid 14.

Thus, even when an air space exists between the top lid 14 and the coolant 23, at least part of the protrusions 141 are in contact with the coolant. Accordingly, it is possible to transfer the heat in the coolant 23 to the top lid 14 through the protrusions 141, and it is therefore possible to sufficiently release the heat from the top lid 14.

When the surface of the coolant 23 is positioned between the level of the lower end portions of the protrusions 141 and the level of the upper end portions thereof, it is possible to sufficiently release the heat from the top lid 14 through the protrusions 141. Thus, there is no need to accurately measure the amount of coolant 23 when the coolant 23 is injected into the container body 13.

Next, a configuration of each part of the battery device 1 will be described in detail. The outer surface of the container body 13 is provided with a number of radiator fins 31, which increase the area of the surface that is in contact with the air, for accelerating heat dissipation from the battery pack 12.

Examples of materials that can be used for the top lid 14 and the container body 13 include metallic materials, such as a highly heat-conductive stainless steel.

The container body 13 is installed on a floor panel 2 under seats of the vehicle with fastening members (not shown).

Figure 4:
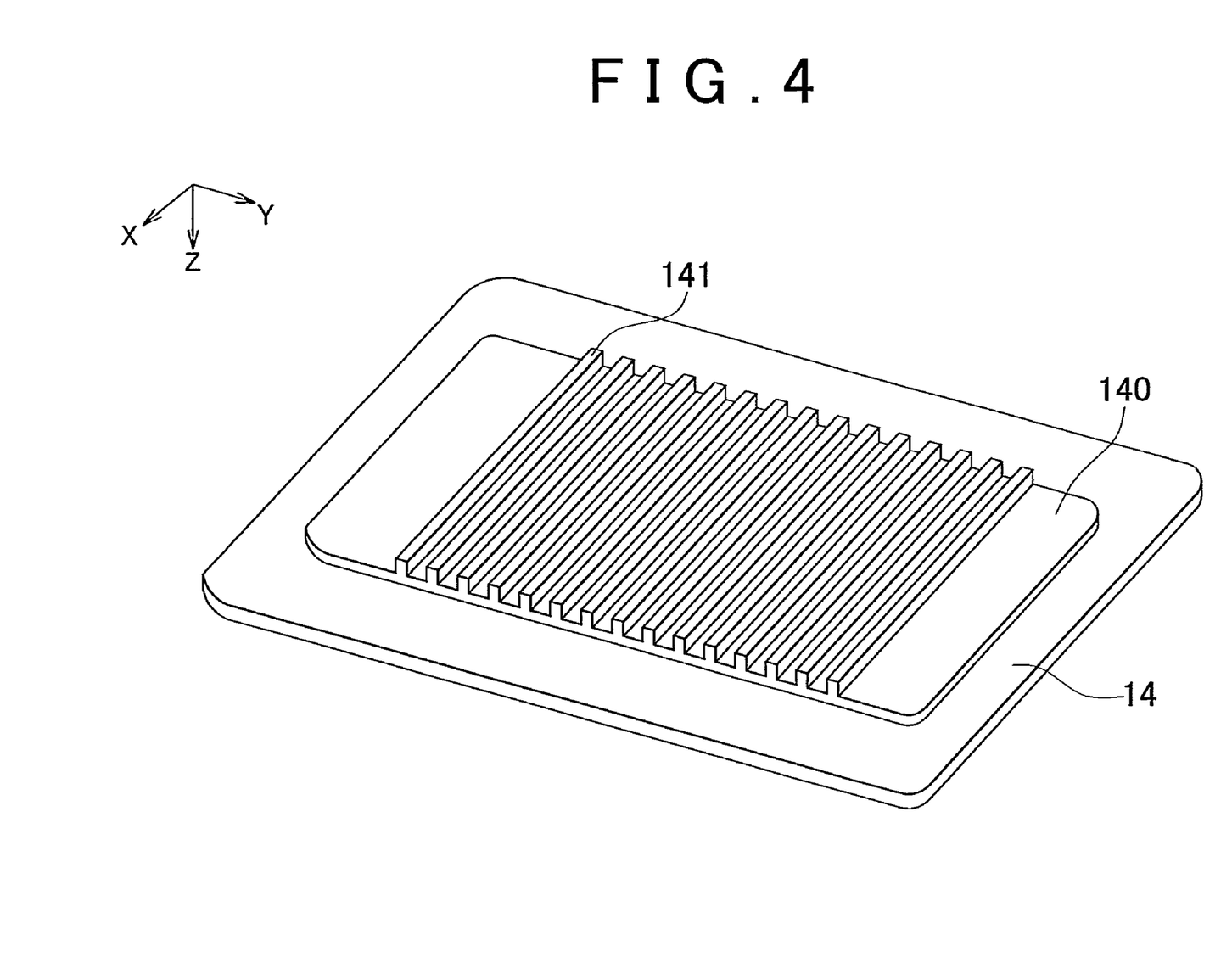
FIG. 4 is a perspective view of a top lid.

Next, a configuration of the top lid 14 will be described in detail with reference to FIGS. 1 to 4. FIG. 4 is a perspective view of the top lid 14.

An inner plate portion 140 is integrally formed with the inner surface of the top lid 14. In a state where the top lid 14 is fixed to the container body 13, the surfaces at the edges of the inner plate portion 140 with respect to the horizontal direction thereof (the edge surfaces that are perpendicular to the X-Y plane) are in contact with the inner surfaces of the container body 13.

The inner surface of the end portion of the top lid 14 that is located outside of the inner plate portion 140 is in contact with the lid fixation surface 13e of the container body 13, and the top lid 14 is fixed onto the lid fixation surface 13e with fastening members (not shown). Fixation may be performed by welding or adhesion using an adhesive agent.

The plurality of protrusions 141 are integrally formed with the inner plate portion 140. The shape of the cross section of each of the protrusions 141 taken along the Y-Z plane is rectangular, and the protrusions 141 extend in the horizontal direction (X direction) that is perpendicular to the longitudinal direction of the cylindrical battery 122. The intervals between the protrusions 141 are set equal to each other.

Most part of each of the protrusions 141, including the lower end portion thereof, is in contact with the coolant 23, and the remaining portion thereof is not in contact with the coolant 23. Specifically, there is an air space between the coolant 23 and the inner plate portion 140 in FIG. 3.

When the protrusions 141 are formed on the top lid 14, the resistance to pressure of the enclosed container 11 is enhanced. Thus, it is possible to provide a battery device 1 that has enough strength to withstand pressure even when the inner pressure of the enclosed container 11 increases due to the gas produced by the cylindrical batteries 122 when these batteries are overcharged.

Next, a configuration of the battery pack 12 will be described in detail with reference to FIGS. 1 and 2.

The battery pack 12 is a battery assembly in which the plurality of cylindrical batteries 122 are arranged in parallel with each other, and the plurality of cylindrical batteries 122 are held between the pair of battery holders 123.

The cylindrical battery 122 is a lithium-ion battery in which lithium cobalt oxide ($LiCoO_2$) is used as the positive electrode active material, and carbon is used as the negative electrode active material. However, the cylindrical battery is not limited to this, but may be another secondary battery. An electric double-layer capacitor may be used instead of the cylindrical battery 122. In this electric double layer capacitor, for example, an aluminum foil can be used as a current collector, activated carbon can be used as the positive electrode active material and the negative electrode active material, and a porous film made of polyethylene can be used as a separator.

Screw electrodes 131 and 132 of each of the cylindrical batteries 122 protrude from the pair of battery holders 123, and are electrically connected through bus bars 124. The bus bars 124 are fixed using fastening nuts 125 that are screwed onto the screw electrodes 131 and 132.

The battery holders 123, at the upper end surfaces thereof, are fixed to the inner surface of the top lid 14, so that the top lid 14 and the battery pack 12 are assembled into a unit. Examples of the methods of fixing the battery holders 123 include fastening using fastening members, welding, and adhesion using an adhesive agent.

In a driving power source or an auxiliary power source for a vehicle that is formed by arranging the plurality of cylindrical batteries 122 in parallel with each other, the temperature increase caused by heat generation due to charge and discharge is large. Thus, when such a power source is cooled only by air cooling using cooling air flow, cooling can be insufficient. Thus, in the present embodiment, the battery pack 12 is immersed in the coolant 23 that has a heat conductivity higher than that of gas, to cool the battery pack 12.

As the coolant 23, a substance is suitable that has high specific heat, high heat conductivity, and high boiling point, that does not corrode the container body 13 and the battery pack 12, and that is less prone to be thermally decomposed, oxidized by air, or electrolyzed. In addition, in order to prevent a short circuit between terminals, an electrically insulating liquid is suitable. For example, a fluorochemical inert liquid can be used. As the fluorochemical inert liquid, Fluorinert, Novec HFE (hydrofluoroether), and Novec 1230 (registered trademarks), made by 3M, can be used. Alternatively, a liquid (silicone oil, for example), other than the fluorochemical inert liquid, can also be used.

Next, an assembly process of the battery device 1 will be briefly described. First, the coolant 23 is injected into the container body 13, and the top lid 14 is then put on the lid fixation surface 13e of the container body 13. Because the top lid 14 and the battery pack 12 are assembled into a unit, when the top lid 14 is put on the lid fixation surface 13e, the installation of the battery pack 12 is also performed. Thus, it is possible to make it easy to perform positioning of the battery pack 12.

Next, the top lid 14 is fixed onto the lid fixation surface 13e. Examples of the methods of fixation include fastening using fastening members (not shown), adhesion using an adhesive agent, and welding. It should be noted that an oil seal (not shown) may be interposed between the top lid 14 and the lid fixation surface 13e to provide tight sealing against the coolant 23.

It suffices that the amount of the coolant 23 is set so that the surface of the coolant 23 is positioned between the level of the lower end portions of the protrusions 141 and the level of the upper end portions thereof in a state where the top lid 14 is fixed to the container body 13. Thus, there is no need to accurately measure the amount of the coolant 23 when the coolant 23 is injected into the container body 13. This makes it possible to efficiently assemble the battery device 1.

Figure 5:
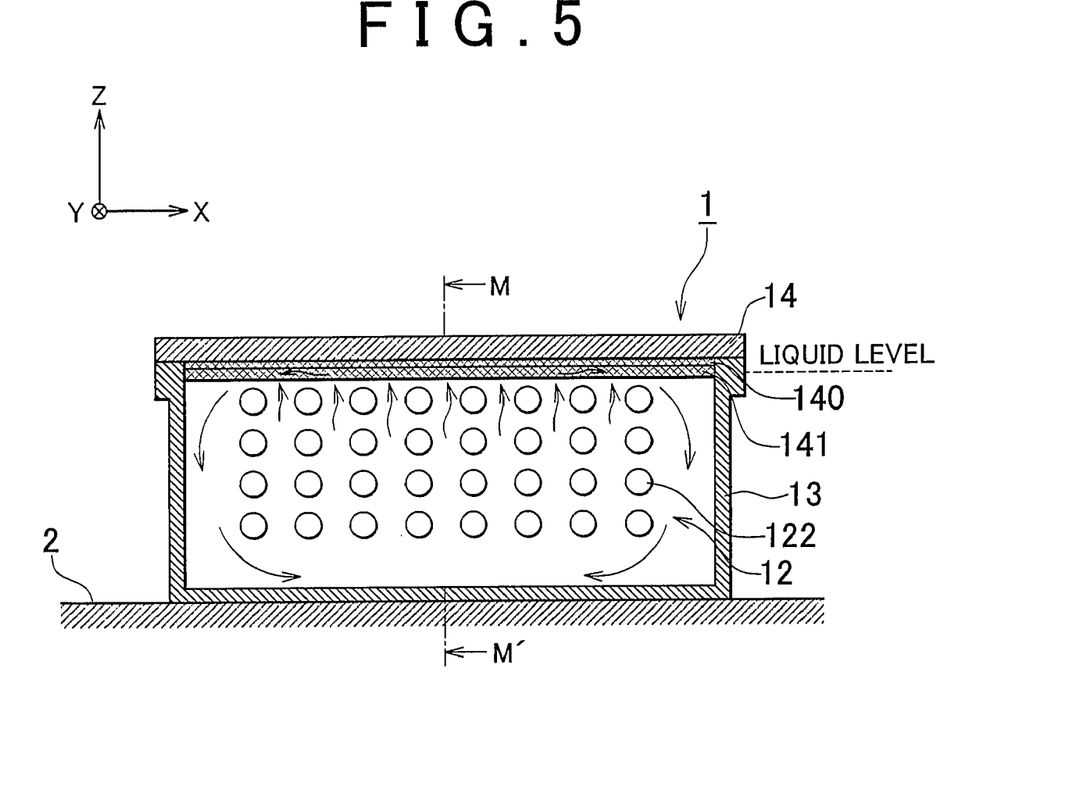
FIG. 5 is a sectional view, taken along the line Z-Z', of the battery pack 1 shown in FIG. 2.

Next, behavior of the coolant 23 that occurs when the battery pack 12 is charged or discharged will be described with reference to FIGS. 2 to 5. FIG. 5 is a sectional view taken along the line V-V' of the battery device 1 shown in FIG. 2, where the arrow indicates the direction of flow of the coolant 23 in which natural convection occurs. It should be noted that the coolant 23 is omitted to simplify the drawing.

The part of the coolant 23 of which the temperature increases after cooling the battery pack 12 that produces heat during charge and discharge, moves upward in the container body 13 because of the difference in specific gravity. When an air space exists between the top lid 14 and the coolant 23 (see FIG. 3), heat transfer rate, is reduced, and the heat in the coolant 23 is not easily dissipated directly from the top lid 14.

The heat in the coolant 23 is transmitted to the protrusions 141 extending into the coolant 23, and is released from the top lid 14 through the inner plate portion 140. This causes the temperature of the coolant 23 to drop, so that it is possible to increase the life of the battery pack 12.

The part of the coolant 23 near the protrusions 141 flows, due to natural convection, in different directions on both sides of the border, the center plane M-M' of the battery device 1. Specifically, the left part of the coolant 23 with respect to the center plane M-M' flows substantially horizontally leftward, guided by the protrusions 141, passing the spaces between the protrusions 141. On the other hand, the right part of the coolant 23 with respect to the center plane M-M' flows substantially horizontally rightward, guided by the protrusions 141 as in the case of the left part of the coolant 23. When this occurs, the heat in the coolant 23 is released from the top lid 14 through the protrusions 141. Thus, the protrusions 141 also serve as the guiding portions that lead, in the horizontal (right and left) directions, the coolant 23 that moves upward in the container body 13 after absorbing the heat of the battery pack 12.

When these parts of the coolant 23 reach the horizontally outer regions in the battery pack 12, the direction of flow is gradually changed downward, and, after the coolant 23 is brought into contact with the inner side surfaces of the container body 13, the coolant 23 flows into the bottom region in the battery pack 12.

When the protrusions 141 are arranged to extend in the direction in which the coolant 23 flows due to natural convection, it is possible to rectify the flow of the coolant 23. Thus, the coolant 23 is sufficiently stirred, so that it is possible to minimize the unevenness of temperature of the coolant 23. As a result, it is possible to increase the life of the battery pack 12.

Modifications of the top lid 14 will be described with reference to FIGS. 6A, 6B, 6C and 7. FIGS. 6A, 6B, 6C and 7 are perspective views showing the modifications of the top lid 14.

First Modification

Figure 6A:
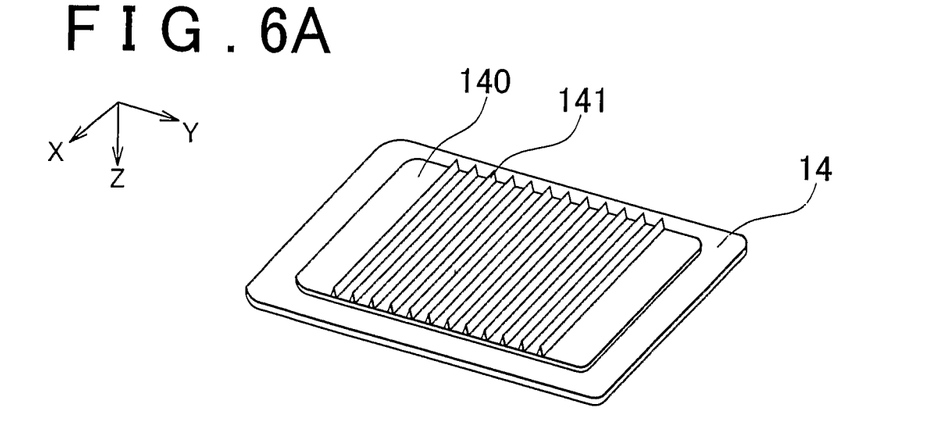
FIGS. 6A, 6B and 6C show modifications of the top lid.

In FIG. 6A showing a first modification, the shape of the cross section of the protrusion 141 taken along Y-Z plane is triangular. Thereby, effects similar to those achieved by the first embodiment can be achieved.

Second Modification

Figure 6B:
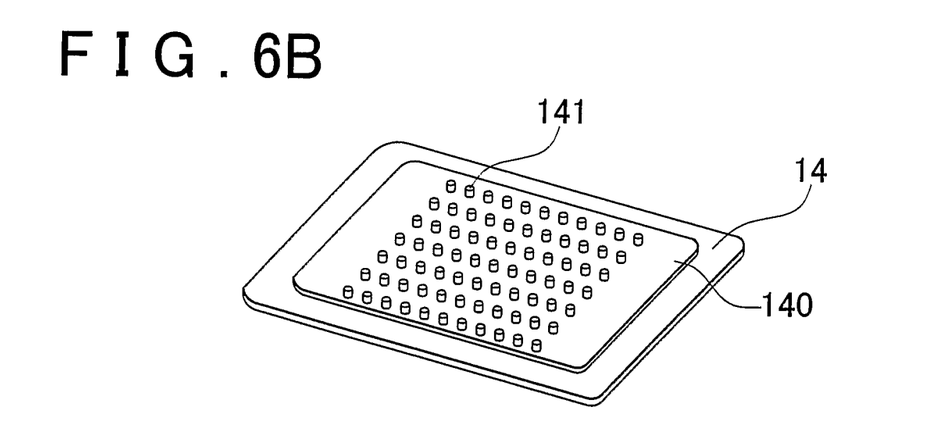

In FIG. 6B showing a second modification, cylindrical protrusions 141 are formed on the inner plate portion 140 in a matrix arrangement. Although the second modification is inferior to the first embodiment and the first modification in the ability of rectifying the flow of the coolant 23 due to natural convection, it is possible to transfer the heat in the coolant 23 to the top lid 14 through the protrusions 141 also with the second modification.

Third Modification

Figure 6C:
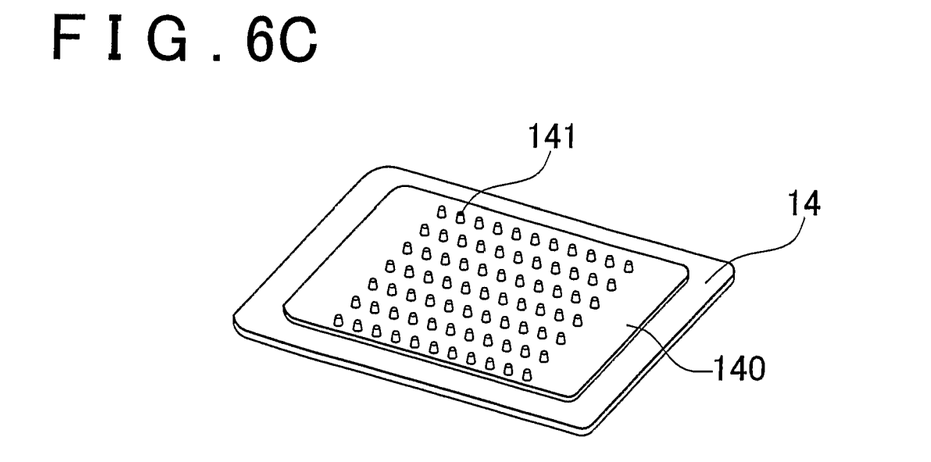

In FIG. 6C showing a third modification, truncated cone-shaped cylindrical protrusions 141 are formed on the inner plate portion 140 in a matrix arrangement. Thereby, effects similar to those achieved by the second modification can be achieved.

Fourth Modification

Figure 7:
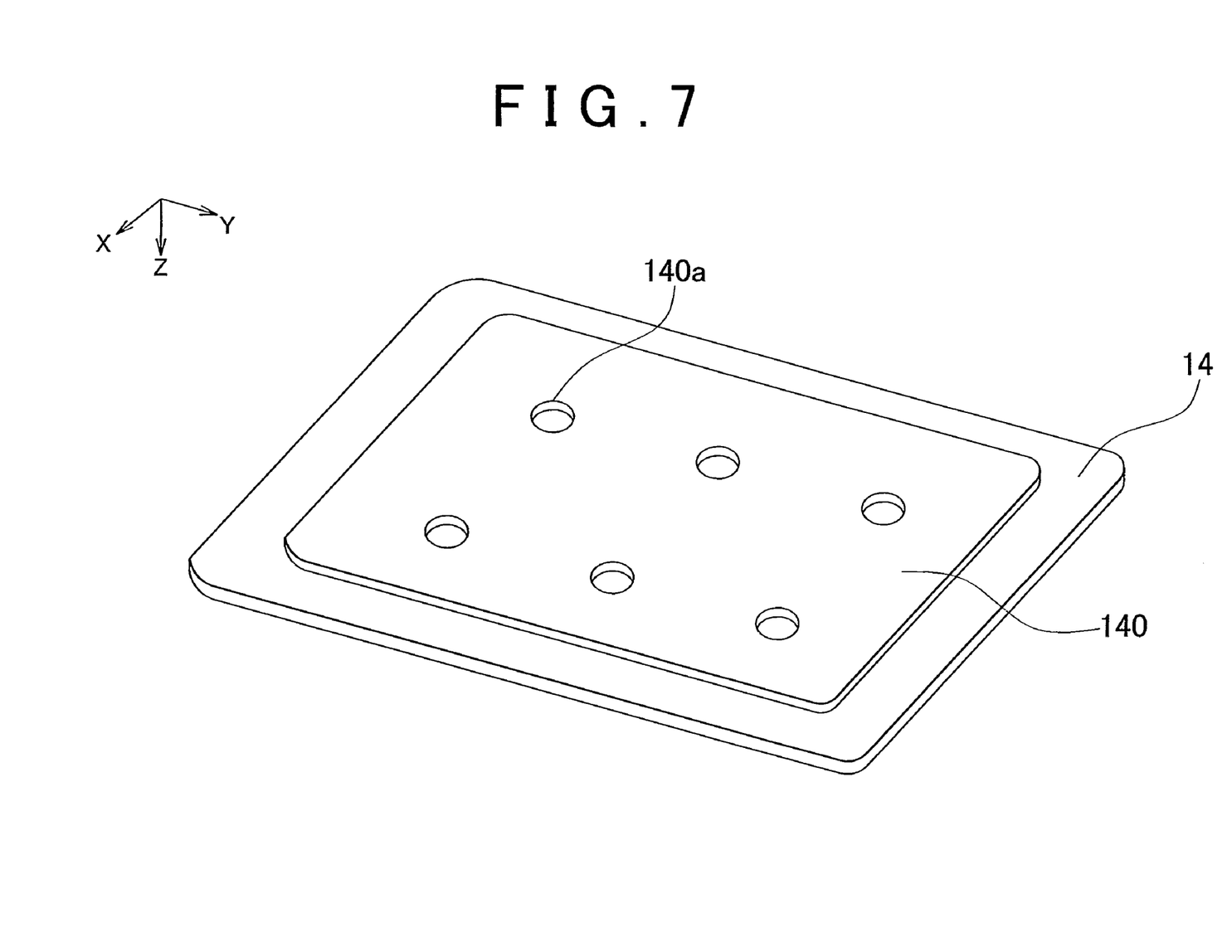
FIG. 7 is a perspective view showing a modification of the top lid.

In FIG. 7 showing a fourth modification, a number of holes 140a are formed in an inner plate-protrusion portion 140' into which the inner plate portion and the protrusions are integrated. The dimension in the height direction (Z direction) of the inner plate-protrusion portion 140' is set greater than that of the first embodiment. Thus, the bottom surface of the inner plate-protrusion portion 140' is immersed in the coolant 23, and the coolant 23 enters into at least part (or all) of the holes 140a, so that two layers, air and the coolant 23, exists in the space in each of the holes 140a. Thereby, effects similar to those achieved by the second and third modifications can be achieved.

Other Embodiments

Although, in the above embodiments, the top lid 14, the inner plate portion 140, and the protrusions 141 are integrally formed, these components may be formed separately. In this case, the member into which the inner plate portion 140 and the protrusions 141 are integrated may be fixed to the inner surface of the top lid 14, or may be fixed to the inner side surfaces of the container body 13 with the member in contact with the inner surface of the top lid 14. In summary, there is no need to form the protrusions 141 integrally with the top lid 14, as long as a configuration is realized with which the heat of the coolant 23 absorbed by the protrusions 141 is transmitted to the top lid 14.

In addition, a discharging pipe for discharging, into the outside of the battery device 1, the gas produced by the cylindrical batteries 122 when an abnormality occurs in the battery or batteries, may be connected to the top lid 14. This makes it possible to restrict the increase in the inner pressure of the enclosed container 11 when an abnormality occurs in the battery or batteries.

The invention can also be applied to a rectangular storage battery that serves as an electricity storage unit.

While the invention has been described with reference to what are considered to be embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, fewer, or only a single element, are also within the scope of the invention.

The invention claimed is:

1. An electricity storage device comprising:
    an enclosed container provided with a top lid;
    an electricity storage unit contained in the enclosed container;
    an electrically insulating liquid coolant, contained in the enclosed container, for cooling the electricity storage unit; and
    at least one protrusion, protruding from the top lid into the liquid coolant, for transferring heat in the liquid coolant to the top lid of the enclosed container,
    wherein the electricity storage unit is immersed in the liquid coolant, and
    wherein a lower end portion of the protrusion is in contact with the liquid coolant in which the electricity storage unit is immersed.

2. The electricity storage device according to claim 1, wherein the protrusion is formed only on the top lid.

3. The electricity storage device according to claim 2, wherein a plurality of the protrusions are provided.

4. The electricity storage device according to claim 2, wherein the electricity storage unit includes a plurality of electricity storage elements that are electrically connected.

5. The electricity storage device according to claim 4, wherein:
    each of the electricity storage elements has a cylindrical shape; and
    each of the protrusions extends in a direction perpendicular to a longitudinal direction of the electricity storage elements.

6. The electricity storage device according to claim 4, wherein:
    the electricity storage unit has a pair of holding members, each of the electricity storage elements has a cylindrical shape, and the plurality of electricity storage elements are arranged between the pair of holding members such that axes of the electricity storage elements are mutually parallel; and
    the protrusions extend in a direction perpendicular to an axial direction of the electricity storage elements.

7. The electricity storage device according to claim 6, wherein a top region of the pair of holding members is fixed to the top lid.

8. The electricity storage device according to claim 2, wherein:
    the top lid includes an inner plate portion; and
    the protrusion is formed on the top lid with the use of the inner plate portion.

9. The electricity storage device according to claim 8, wherein:
    the top lid is made of a material with thermal conductivity; and
    the top lid, the inner plate portion, and the protrusion are integrally formed.

10. The electricity storage device according to claim 3, wherein the electricity storage unit includes a plurality of electricity storage elements that are electrically connected.

11. The electricity storage device according to claim 10, wherein:
    each of the electricity storage elements has a cylindrical shape; and
    each of the protrusions extends in a direction perpendicular to a longitudinal direction of the electricity storage elements.

12. The electricity storage device according to claim 10, wherein:
    The electricity storage unit has a pair of holding members, each of the electricity storage elements has a cylindrical shape, and the plurality of electricity storage elements are arranged between the pair of holding members such that axes of the electricity storage elements are mutually parallel; and
    the protrusions extend in a direction perpendicular to an axial direction of the electricity storage elements.

13. The electricity storage device according to claim 11, wherein a top region of the pair of holding members is fixed to the top lid.

14. The electricity storage device according to claim 3, wherein:
    the top lid includes an inner plate portion; and
    the protrusion is formed on the top lid with the use of the inner plate portion.

15. The electricity storage device according to claim 14, wherein:
    the top lid is made of a material with thermal conductivity; and
    the top lid, the inner plate portion, and the protrusion are integrally formed.

16. The electricity storage device according to claim 1, wherein the protrusion is a solid structure.

17. The electricity storage device according to claim 1, wherein the protrusion is a rigid structure.

18. A method of manufacturing an electricity storage device in which an enclosed container including a container body and a top lid contains an electricity storage unit and an electrically insulating liquid coolant for cooling the electricity storage unit, comprising:
    forming at least one protrusion on an inner surface of the top lid; and
    injecting the liquid coolant into the container body such that a lower end portion of the protrusion is in contact with the liquid coolant in which the electricity storage unit is immersed.

* * * * *